Oct. 31, 1961     D. W. BRADY     3,006,272
HAY CONDITIONING DEVICE
Filed March 18, 1959     3 Sheets-Sheet 2
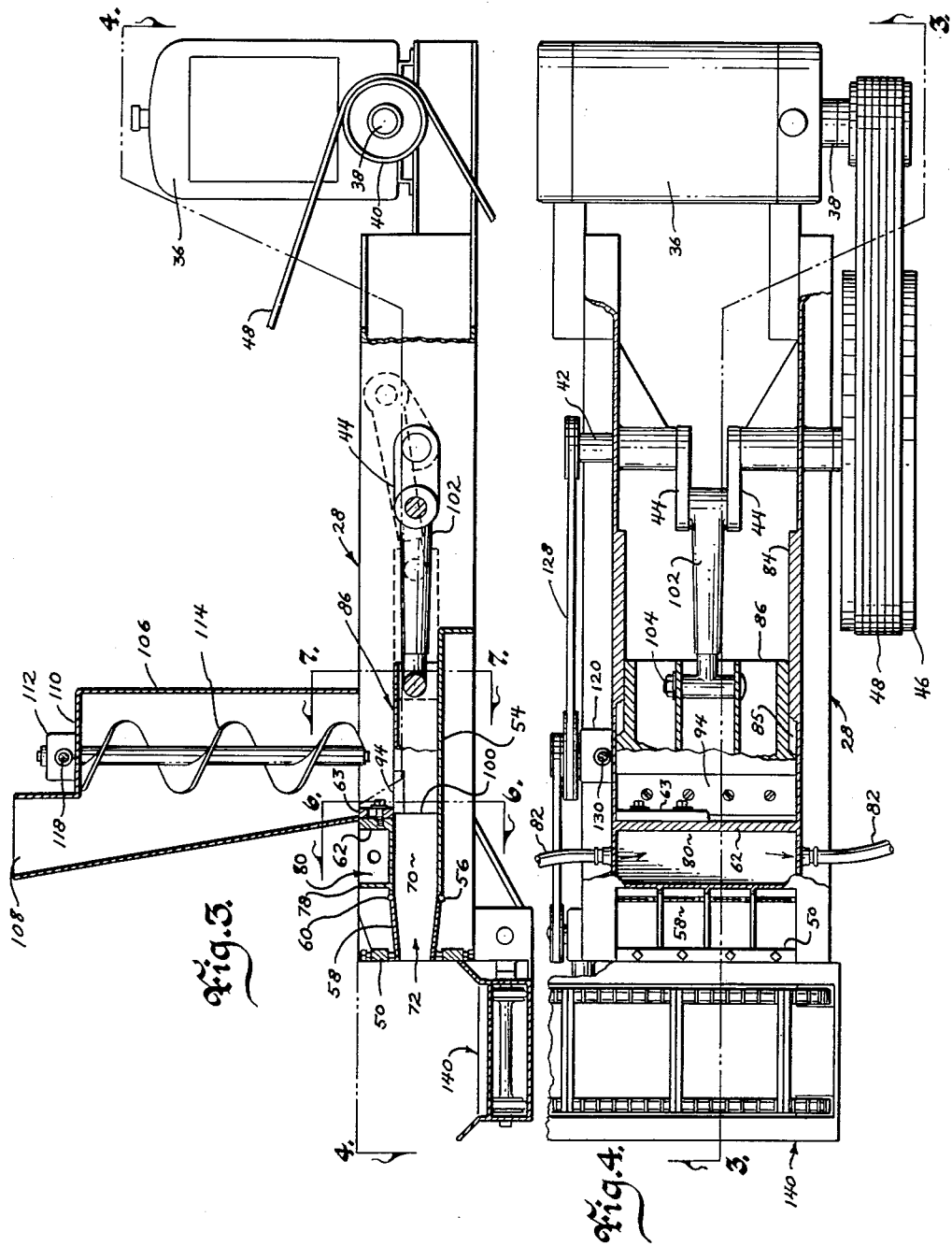
Witness
Edward P. Seeley
Inventor
Dale W. Brady
by Talbert Click and Zarley
Attorneys Oct. 31, 1961  D. W. BRADY  3,006,272
HAY CONDITIONING DEVICE
Filed March 18, 1959  3 Sheets-Sheet 3
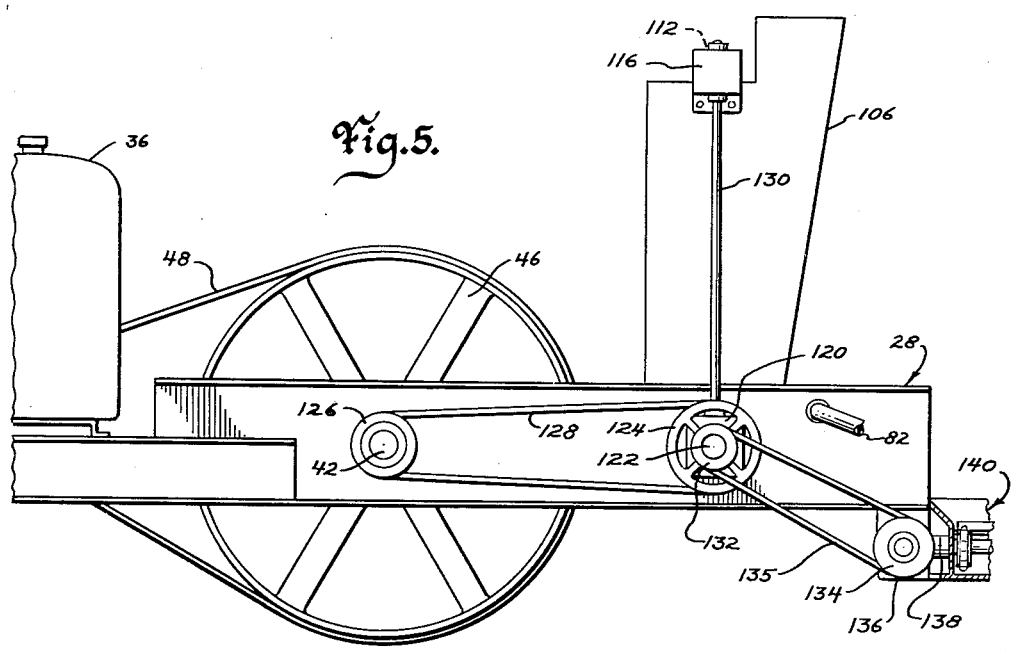
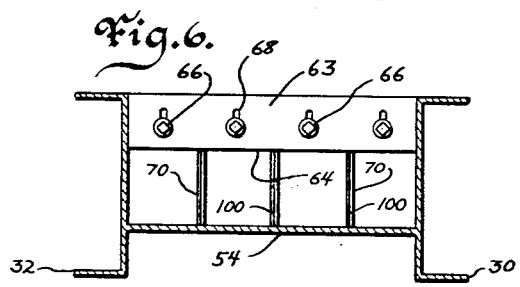
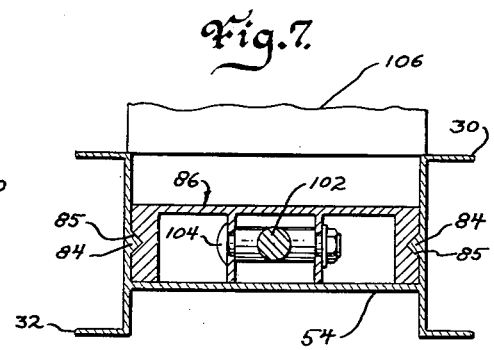
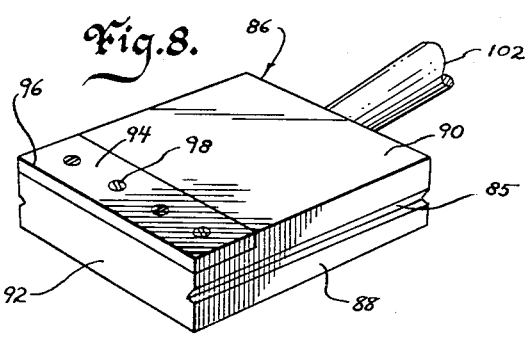
Inventor
Dale W. Brady 3,006,272
HAY CONDITIONING DEVICE
Dale W. Brady, Altoona, Iowa, assignor to Brady Manufacturing Corporation, Des Moines, Iowa, a corporation of Ohio
Filed Mar. 18, 1959, Ser. No. 800,144
6 Claims. (Cl. 100—93)

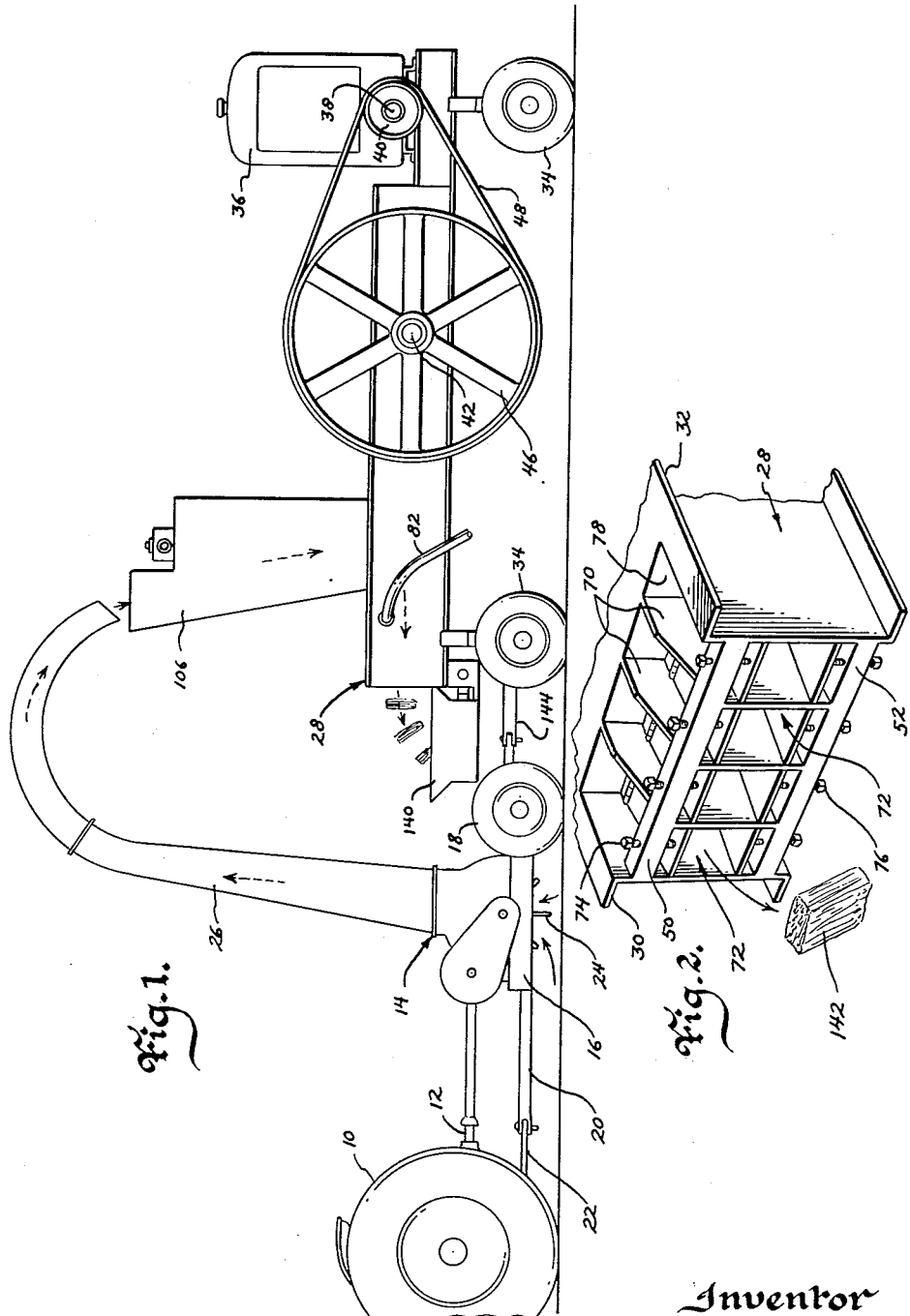

My invention relates to hay conditioning implements and more particularly to a hay conditioning implement that will divide and compress the hay into biscuit-type units.

Various types have been cut for hay to be used in feeding farm animals for many, many years. Hay has been stored in large stacks and is sometimes placed loosely in barns and the like. However, with the advent of modern farm machinery, hay is often cut and placed in bales which often weigh from 60 to 100 pounds. But even when formed into bales, hay is very difficult to store or to transport because it takes up a great deal of volume in comparison to its weight. This is a very serious problem in the transportation field because it takes several vehicles to carry the weight load that one vehicle could handle if this great volume of hay could be loaded on one vehicle. This same problem in transporting hay is present in shipping hay over water as well as over land.

Therefore, the principal object of my invention is to provide a hay conditioning device that will greatly increase the density of hay with respect to its volume.

A further object of my invention is to provide a hay conditioning device that will compress the hay into biscuit-type units that can be easily fed to livestock.

A still further object of my invention is to provide a hay conditioning device that can compress the hay into biscuit-type units at a very rapid rate.

A still further object of my invention is to provide a hay conditioning device that can form the hay into biscuit-type units and which also can compensate for differences in the moisture content of the hay.

A still further object of my invention is to provide a hay conditioning device that can form the hay into biscuit-type units and which can also protect the biscuit-type units from damage caused by the frictional heat of compression.

A still further object of my invention is to provide a hay conditioning device that will chop the hay into short lengths before the biscuit-type units are formed so as to assist in the biscuit-type forming operation.

A still further object of my invention is to provide a hay conditioning device which is economical of manufacture, durable in use and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a side elevational view of my device as being towed by a conventional tractor;

FIG. 2 is a partial perspective view of the forward portion of my unit where the biscuit-type units are ejected into the conveyor;

FIG. 3 is a partial sectional view of the biscuit forming part of my device and is taken on line 3—3 of FIG. 4;

FIG. 4 is a partial sectional view of my device as taken on line 4—4 of FIG. 3;

FIG. 5 is a partial side elevational view of my device showing the details of the auger and conveyor power mechanisms, this view is taken from the opposite side of my device as shown in FIG. 1;

FIG. 6 is a partial sectional view of my device taken on line 6—6 of FIG. 3;

FIG. 7 is a partial sectional view of my device as taken on line 7—7 of FIG. 3; and FIG. 8 is a perspective view of the front end portion of my plunger unit.

I have used the numeral 10 to generally designate a farm tractor which has a power take-off shaft 12. The numeral 14 generally designates my hay chopper unit of the type described in my co-pending patent application Serial Number 512,841, filed June 2, 1955, now Patent No. 2,882,667. The details of my hay chopper unit are not critical to this invention except it is important that a means for chopping and delivering hay be used in combination with the biscuit forming part of my invention. The hay chopping means 14 is comprised generally of a frame 16, which is supported by wheels 18, a tongue 20 which is secured in conventional fashion to the drawbar 22 of the tractor, hay chopping members 24, and an upwardly and rearwardly extending chute 26. As shown in FIG. 1, the growing hay is cut and follows the course of the arrows up through the hay chopping means 14 and upwardly and rearwardly through the chute 26.

Frame 28 of the biscuit forming portion of my device is comprised of two elongated channel members 30 and 32. Frame 28 is supported by wheels 34. An internal combustion engine 36 is mounted on the rearward end of frame 28. A power shaft 38 extends out of engine 36 in a lateral direction from the side of frame 28. A multi-belt pulley is rigidly mounted on the outward end of shaft 38 and this pulley is designated by the numeral 40. A conventional crankshaft 42 with conventional links 44 extends laterally across frame 28 forwardly of engine 36 and flywheel 46 is mounted on one end thereof. The flywheel 46 and crankshaft 42 are adapted for rotational movement on frame 28 and the flywheel 46 is in alignment with the pulley 40 which is located rearwardly on the frame. A plurality of belts 48 connect flywheel 46 and pulley 40.

As shown in FIG. 2, two horizontal bars 50 and 52 extend laterally across the front end of frame 28. A horizontal plate 54 extends across the bottom forward portion of frame 28 and is clearly shown in FIG. 3. As clearly shown in FIG. 3, the portion of plate 54 forwardly of point 56 is not welded to the frame as is the remainder of plate 54. Similarly, a horizontal plate 58 extends laterally across the forward upper portion of frame 28 and the portion of plate 58 forward of point 60 is not welded to frame 28 as is the remainder of plate 58. As shown in FIG. 3, points 60 and 56 on plates 58 and 54, respectively, are located directly above and below each other. It should be also noted that plate 58 terminates at a point forwardly and above the rearmost end of plate 54. A bar 62 extends across frame 28 just above the rearmost end of plate 58. As shown in FIG. 6, a cutter bar 63 with a lower cutting edge 64 is secured to the rearward end of bar 62 by a plurality of bolts 66. It should be noted that bolts 66 extend through vertical slots 68 in cutter bar 63. The bolts 66 and the slots 68 in cutter bar 63 co-operate to permit vertical adjustment of the cutter bar. Three vertical plates 70 divide the forward end of frame 28 into four equal space increments. Plates 70 can be welded to plates 54 and 58 rearwardly of points 56 and 60. As shown in FIG. 2, vertical plates 70 extend through plates 58 and 54 and the plates 58 and 54 along with the vertical plates 70 and the frame 28 co-operate together to provide four equal elongated compartments 72 which are substantially square in cross-sectional area. It should be noted again that the forward ends of plates 58 and 54 are not rigidly secured to either the frame 28 or the vertical plates 70. A plurality of bolts 74 are threadably mounted on bar 50 and extend downwardly therein directly above those portions of plate 58 which are directly above and form a part of the forward end of compartment 72. Similarly, bolts 76 are threadably mounted in and extend upwardly into bar 52 and are capable of engaging those portions of plate 54 which comprise the forward lower end of compartment 72. A vertical wall 78 extends laterally across frame 28 on top of plate 58 at a point rearwardly of point 60 to co-operate with the frame 28, plate 58 and bar 62 to form water-tight compartment 80. Hose connections 82 have communications with opposite ends of compartment 80 and are connected to a source of water supply (not shown) for purposes of flowing water into and out of compartment 80 as shown by the arrows in FIG. 4.

As shown in FIG. 7, horizontal V-rails 84 are formed on the inside of the channels 30 and 32 at a point just above plate 54. The numeral 86 generally designates my plunger unit which is comprised of side plates 88, top plate 90, and forward vertical plate 92. As shown in FIG. 8, V-grooves 85 are formed in plates 88 to receive the rails 84. The height of the plunger unit 86 and the location of the V-rails 84 and the V-grooves 85 are such that the plunger unit is permitted to move over the upper surface of plate 54. A cutting blade 94 is countersunk into the top forward portion of plunger unit 86 and presents a cutting edge on its forward upper end which is designated by the numeral 96. This cutting blade 94 can be detachably secured to the plunger unit 86 by countersunk screws 98. As shown in FIG. 3, the height of the plunger unit 86 is sufficient to just permit the cutting blade 94 to move underneath the cutter bar 63. It should also be noted that the rearward edges of plates 70 between plates 58 and 54 present a sharpened cutting edge 100. The forward plate 92 on plunger 86 is adapted to move up toward the cutting edges 100 on plates 70 as will be discussed hereafter. A connecting rod is pivotally secured by its forward end to plunger 86 by means of pin 104. The rearward end of connecting rod 102 is pivotally mounted in conventional fashion between links 44 on crankshaft 42.

A vertical bin 106 is mounted on top of frame 28 and communicates directly with the portion of plate 54 below and to the rear of cutter bar 63. The forward upper portion 108 of bin 106 is open but top portion 110 closes the upper rearward part of the bin. A gear box and bearing means 112 are mounted on top of portion 110 as shown in FIG. 3 and also in FIG. 5. A vertical auger 114 is suspended downwardly by gear box and bearing means 112 and terminates just above the bottom of cutter bar 63 as shown in FIG. 3. A second gear box 116 is secured to one side of the top portion 110 and a shaft 118 connects the gear box 116 with the gear box and bearing means 112. As shown in FIG. 5, a gear box 120 is mounted on the side of frame 28 directly below the gear box 116 on bin 106. A horizontal shaft 122 extends outwardly from gear box 120 and pulley 124 is rigidly secured thereto. A pulley 126 is secured on the end of crankshaft 42 shown in FIG. 5, and this pulley 126 is in direct alignment with the pulley 124 on gear box 120. A belt 128 interconnects pulleys 124 and 126 in conventional fashion. A vertical shaft 130 interconnects the gear boxes 116 and 120. A second pulley 132 is mounted on the outer end of shaft 122 and is in alignment with the pulley 134 on gear box 136 which is mounted in any convenient fashion to the forward lower end of frame 28. A belt 135 connects pulleys 132 and 134. A conventional conveyor mechanism is secured in any convenient fashion to the lower forward end of frame 28 and is power connected to gear box 136 by shaft 138. The conveyor mechanism, which is of conventional structure, is designated by the numeral 140. Biscuit units 142 are shown to be coming out of the forward end of frame 28 and falling into the conveyor 140 in FIG. 1.

The normal operation of my device is as follows: The internal combustion engine 36 is started which causes flywheel 46 and shaft 42 to rotate through the conventional operation of shaft 38, pulley 40 and belts 48. The rotation of crankshaft 42 by flywheel 46, and the subsequent rotation of links 44, causes the conventional "piston-like" action of connecting rod 102 and plunger unit 86. As described hereinbefore, plunger unit 86 will reciprocate in a forward and rearward direction upon the V-rails 84. Connecting rod 102 and plunger unit 86 are of such length that their forwardmost position will move the cutting edge 96 of the cutting blade 94 on the plunger to a point just underneath the cutting edge 64 on cutter bar 63. The forward vertical plate 92 of plunger 86 will simultaneously be brought to a point immediately adjacent the rearward cutting edges 100 on the vertical plates 70. The rearmost position of plunger 86 will remove the plunger from underneath the bottom of bin 106 and this rearward position of the plunger is shown by the dotted lines in FIG. 3.

As shown in FIG. 5, the rotation of crankshaft 42 will result in the rotation of pulley 124 to the conventional function of pulley 126 and belt 128. The rotation of pulley 124 will effect the rotation of shaft 122 and the vertical shaft 130 will in turn be rotated about its own axis through the conventional function of gear box 120. The rotation of auger 114 will then be effected through the conventional function of gear box and bearing means 112, shaft 118 and gear box 116.

The rotation of shaft 122 by pulley 124 will also effect the rotation of pulley 132 on this same shaft. The shaft 138 on the conveyor means 140 will then be caused to rotate through the conventional function of gear box 136, pulley 134 and belt 135 which inter-connects pulleys 132 and 134. Thus, the foregoing description will cause the reciprocal movement of plunger 86, the rotational movement of auger 114 in bin 106, and the conventional operation of the conveyor means 140.

I have described my biscuit forming apparatus as being mounted on a wheel supported frame 28. This structure could very easily be incorporated on my hay chopper device 14 but for clarity purposes, I have shown the frame 28 connected to the hay chopping means 14 by means of a conventional drawbar unit 144.

The tractor 10 can then tow the chopper means 14 and the biscuit forming apparatus described above into a field of alfalfa hay, for example. The hay chopping means 14 is operated by the power take-off 12 of the tractor 10. In conventional fashion, the hay follows the course of the arrows in FIG. 1 up through the hay chopping means 14 and into the chute 26. The chopped hay is then deposited into the upper forward portion 108 of the bin 106. The auger 114 forces the chopped hay downwardly onto plate 54 rearwardly of cutter bar 63 and at a point to the rear of the biscuit forming compartments 72. As the plunger unit 86 moves from the position of the dotted lines in FIG. 3 to the position shown by the solid lines in this same figure, the chopped hay is pushed forwardly toward the rear end of compartments 72. As the plunger unit 86 attains its forwardmost position, the chopped hay is severed as the cutting edges 64 and 96 on cutter bar 63 and cutting blade 94, respectively, overlap. The sharpened cutting edges 100 on the rear end of vertical plates 70 also sever the cut hay as it passes into the individual compartments 72. One forward stroke of the plunger unit 86 will force only a small amount of cut hay into the compartments but the repeated cycles of the plunger unit continues to compress the cut hay into the compartments 72. I prefer that my plunger 86 have approximately a 16-inch stroke and operating at approximately 140 strokes per minute. Obviously, the compartments 72 soon become filled with cut hay under extreme compression.

The continued compression of chopped hay into the rearward ends of compartments 72 will force tightly compressed biscuit-type units of hay approximately one or two inches in thickness from the forward ends of the compartments 72. The biscuit units 142 will fall by gravity from the forward ends of compartments 72 into the conveyor means 140. The conveyor means 140 can be used to deliver the biscuits 142 to a wagon or other type carrier.

Great heat is generated when the cut hay is forced under compression through the compartments 72 so I have utilized the water-tight compartment 80 and the hose connections 82 to flow water or other suitable cooling liquid adjacent the compartment 72 for cooling purposes.

Cut hay having a high moisture content compresses quite easily but when the hay is very dry, it is more difficult to form a satisfactory biscuit. For this reason, I have provided the screws 74 and 86 in the bars 50 and 52, respectively, to act upon the forward portions of plates 58 and 54 to decrease the cross-sectional diameter of the forward ends of the compartments 72. Thus, if the hay is very dry, the forward ends of the compartments 72 can be decreased as far as their cross-sectional area is concerned which will create more compression of the hay and which will create sufficient compressive force to compress even hay having a relatively small moisture content.

The auger 114 is very important because the chopped hay tends to pile up within the bin 106. However, the action of auger 114 carries this chopped hay downwardly to a point where it can be compressed into the compartments 72. It is much more difficult to form biscuits out of hay that is not chopped by a means such as the chopping means 14. For this reason, a hay chopping means is an essential or at least a very desirable element in my biscuit forming apparatus.

From the foregoing, it is seen that my invention will accomplish at least all of its stated objectives.

Some changes may be made in the construction and arrangement of my hay conditioning device without departing from the real spirit and purpose of my invention, and it is my intention to cover by my claims, any modified forms of structure or use of mechanical equivalents which may be reasonably included within their scope.

I claim:

1. Apparatus for forming hay briquets comprising, in combination, a frame means; a hay inlet chute extending vertically above said frame means; means for delivering prechopped hay to said chute; means carried by said frame means defining a precompression chamber below said chute having opposed open ends and an at least partially open top wall; auger means in said chute for conveying hay delivered to said chute into said precompression chamber through said top wall; a series of compression chambers defined by a plurality of spaced vertically-disposed walls having rear cutting edges and at least two spaced horizontal walls extending the length of said vertical walls and secured along the rear portions thereof in fixed relation to said vertical walls, the forward portions of said horizontal walls being free to move relative to each other; screw means for adjusting the separation between the opposed forward portions of said horizontal walls, said series of compression chambers being horizontally contiguous with one open end of said precompression chamber; plunger means reciprocally movable within said precompression chamber from a forward position adjacent said compression chambers and closing said top wall to an aft position remote from said compression chambers and where said top wall is open; first cutter means supported by said frame means and having a cutting edge adjacent the forward end of said top wall and immediately to the rear of said compression chambers; a second cutter means carried by said plunger means and having a cutting edge at the top forward end of said plunger means; means to rotate said auger and reciprocate said plunger means whereby hay is fed to said precompression chamber, said plunger moves through said precompression chamber, and said second cutter means moves past said first cutter means severing hay entering said precompression chamber and forcing the same into said series of compression chambers.

2. Apparatus for forming hay briquets comprising the combination defined in claim 1 wherein said frame means comprises two elongated channel members, and wherein said series of compression chambers is disposed between said channel members, with said channel members defining the outside end walls of the end chambers of said series.

3. Apparatus for forming hay briquets comprising in combination frame means; a hay inlet chute extending vertically above said frame means; means for delivering pre-chopped hay to said chute; means carried by said frame defining a precompression chamber below said chute having opposed open ends and an at least partially open top wall; auger means in said chute for conveying hay delivered to said chute into said precompression chamber through said top wall; a series of compression chambers horizontally contiguous with one open end of said precompression chamber; plunger means reciprocally movable within said precompression chamber from a forward position adjacent said compression chambers and closing said top wall to an aft position remote from said compression chambers and where said top wall is open; first cutter means supported by said frame means and having a cutting edge adjacent the forward end of said top wall and immediately to the rear of said compression chambers; second cutter means carried by said plunger means and having a cutting edge at the top forward end of said plunger means; means to rotate said auger and reciprocate said plunger means whereby hay is fed to said precompression chamber, said plunger means moves through said precompression chamber, and said second cutter means moves past said first cutter means severing hay entering said precompression chamber and forcing the same into said series of compression chambers; and a circulating chamber above the rear portion of said compression chambers adapted to have a cooling liquid passed therethrough to dissipate the heat of compression of said hay.

4. Apparatus for forming hay briquets comprising the combination defined in claim 3 wherein said series of compression chambers is formed by vertically-disposed walls having rear cutting edges, and horizontal walls extending the length of said vertical walls and the rear portions thereof in fixed relation to said vertical walls; the forward portions of said horizontal walls being free to move relative to each other, and wherein screw means are provided for adjusting the separation between the opposed forward portions of said horizontal walls.

5. Apparatus for forming hay briquets comprising the combination defined in claim 4 and further including ground-engaging wheels and means for securing said wheels to said frame means whereby said apparatus is mobile, and wherein said means for rotating said auger and reciprocating said plunger comprises an internal combustion engine carried on said frame means, and drive means coupled between said engine, said auger and said plunger means.

6. Apparatus for forming hay briquets comprising, in combination, a frame means; a hay inlet chute extending vertically above said frame means; means carried by said frame means defining a precompression chamber below said chute having opposed open ends and an at least partially open top wall; feed means in said chute for conveying hay delivered to said chute into said precompression chamber through said top wall; a series of compression chambers defined by a plurality of spaced vertically-disposed walls having rear cutting edges and at least two spaced horizontal walls extending the length of said vertical walls and secured along the rear portions thereof in fixed relation to said vertical walls, the forward portion of at least one of said horizontal walls being free to move relative to the other; means for adjusting the separation between the opposed forward portions of said horizontal walls, said series of compression chambers being horizontally contiguous with one open end of said precompression chamber; plunger means reciprocally movable within said precompression chamber from a forward position adjacent said compression chambers and closing said top wall to an aft position remote from said compression chambers and where said top wall is open; first cutter means supported by said frame means and having a cutting edge adjacent the forward end of said top wall and immediately to the rear of said compression chambers; a second cutter means carried by said plunger means and having a cutting edge at the top forward end of said plunger means; means to operate said feed means and reciprocate said plunger means whereby hay is fed to said precompression chamber, said plunger moves through said precompression chamber, and said second cutter means moves past said first cutter means severing hay entering said precompression chamber and forcing the same into said series of compression chambers; and a circulating chamber above the rear portion of said compression chambers adapted to have a cooling liquid passed therethrough to dissipate the heat of compression of said hay.

References Cited in the file of this patent

UNITED STATES PATENTS

| | | |
|---|---|---|
| 649,413 | Luzzatto | May 8, 1900 |
| 657,607 | Luzatto | Sept. 11, 1900 |
| 729,149 | Fenn | May 26, 1903 |
| 810,998 | Thomas | Jan. 30, 1906 |
| 826,007 | Wurl | July 17, 1906 |
| 2,379,371 | Moschel et al. | June 26, 1945 |
| 2,716,317 | McClellan | Aug. 30, 1955 |
| 2,716,318 | Skromme | Aug. 30, 1955 |